(12) United States Patent
Vroomen

(10) Patent No.: US 11,548,581 B2
(45) Date of Patent: Jan. 10, 2023

(54) BICYCLE DRINKING ASSEMBLY CONFIGURED FOR HOLDING A TYPE OF DRINKING BOTTLES WITH LARGE VOLUME BASE BODIES AS WELL AS STANDARD ONES WITH CYLINDRICAL BASE BODIES

(71) Applicant: Just Ride B.V., Amsterdam (NL)

(72) Inventor: Gerard Louis Jean Paul Amaury Vroomen, Amsterdam (NL)

(73) Assignee: Just Ride B.V., Amsterdam (NL)

( * ) Notice: Subject to any disclaimer, the term of this patent is extended or adjusted under 35 U.S.C. 154(b) by 0 days.

(21) Appl. No.: 17/361,436

(22) Filed: Jun. 29, 2021

(65) Prior Publication Data

US 2022/0009581 A1    Jan. 13, 2022

(30) Foreign Application Priority Data

Jun. 29, 2020  (NL) ...................................... 2025938

(51) Int. Cl.
*B62J 11/04* (2020.01)
*B62J 9/22* (2020.01)
*A45F 3/16* (2006.01)

(52) U.S. Cl.
CPC ................ *B62J 11/04* (2020.02); *A45F 3/16* (2013.01); *B62J 9/22* (2020.02)

(58) Field of Classification Search
CPC ....................................................... B62J 11/04
See application file for complete search history.

(56) References Cited

U.S. PATENT DOCUMENTS

| 4,071,175 A | * | 1/1978 | Wagnon | B62J 11/04 248/230.8 |
| 4,441,638 A | | 4/1984 | Shimano | |
| 4,948,080 A | * | 8/1990 | Jack | B62J 11/04 224/452 |
| 5,178,308 A | * | 1/1993 | Endre | B62J 11/04 224/462 |

(Continued)

FOREIGN PATENT DOCUMENTS

| CN | 201217465 Y | * | 4/2009 |
| CN | 201977039 U | | 9/2011 |

(Continued)

OTHER PUBLICATIONS

Netherlands Search Report, dated Mar. 30, 2021, 10 pages.

*Primary Examiner* — Justin M Larson
(74) *Attorney, Agent, or Firm* — Hoffmann & Baron, LLP

(57) ABSTRACT

A bicycle drinking assembly includes a non-cylindrical type large volume drinking bottle and a bottle cage with a holding compartment that is configured to be mounted by mounting elements on a mounting face of a tube of a bicycle frame. The compartment is configured for holding the large volume drinking bottle or to hold a cylindrical type drinking bottle of a diameter that fits within cross-sectional dimensions of a base body of the large volume drinking bottle. The mounting elements and/or first holding compartment form at least three points of contact that lie at a radius that is equal to half the diameter of the cylindrical type drinking bottle and that are divided over more than 180 degrees of the circumference of the cylindrical type drinking bottle.

15 Claims, 10 Drawing Sheets

(56) References Cited

U.S. PATENT DOCUMENTS

| | | | | |
|---|---|---|---|---|
| 5,426,570 A * | 6/1995 | Davis | ................... | B62J 6/028 |
| | | | | 340/432 |
| 5,522,527 A * | 6/1996 | Tsai | ................... | B62J 29/00 |
| | | | | 224/558 |
| 5,806,730 A * | 9/1998 | Deno | ................... | B62J 11/04 |
| | | | | 224/579 |
| 6,059,245 A * | 5/2000 | Hermansen | ........... | B62J 11/04 |
| | | | | 248/316.5 |
| 6,401,997 B1 * | 6/2002 | Smerdon, Jr. | ............ | B62J 9/26 |
| | | | | 224/442 |
| 9,114,840 B1 * | 8/2015 | Turner | ................... | B62J 11/04 |
| 10,752,309 B2 * | 8/2020 | Oste | ................... | B62J 11/04 |
| 2002/0179662 A1 * | 12/2002 | Young | ................... | B62J 11/04 |
| | | | | 224/451 |
| 2006/0261019 A1 | 11/2006 | Ghao et al. | | |
| 2012/0012626 A1 * | 1/2012 | McKaig | ................ | B62J 11/04 |
| | | | | 224/425 |
| 2013/0161365 A1 * | 6/2013 | Shih | ................... | B62J 11/04 |
| | | | | 224/414 |
| 2013/0270315 A1 * | 10/2013 | Tsai | ................... | B62J 11/04 |
| | | | | 224/414 |
| 2017/0166346 A1 * | 6/2017 | Cornell | ................. | B65D 1/04 |
| 2017/0349229 A1 * | 12/2017 | Drew | ................... | B62J 11/04 |
| 2021/0155310 A1 * | 5/2021 | Tan | ...................... | B62J 11/04 |
| 2022/0009581 A1 * | 1/2022 | Vroomen | ............... | B62J 11/04 |

FOREIGN PATENT DOCUMENTS

| | | | | |
|---|---|---|---|---|
| CN | 203381729 U | | 1/2014 | |
| CN | 112874666 A * | | 6/2021 | |
| DE | 10227612 A1 * | | 1/2003 | ............ B62J 11/00 |
| DE | 10308787 A1 * | | 9/2004 | ............ B62J 11/00 |
| DE | 10308788 A1 * | | 9/2004 | ............ B62J 11/00 |
| DE | 202006013081 U1 * | | 2/2008 | ............ B62J 11/00 |
| DE | 202009005199 U1 * | | 1/2010 | ............ B62J 11/00 |
| DE | 202009013357 U1 * | | 2/2010 | ............ B62J 11/00 |
| DE | 202021106811 U1 * | | 1/2022 | |
| EP | 3708474 A1 * | | 9/2020 | ............ B62J 11/04 |
| EP | 3932791 A1 * | | 1/2022 | ............ A45F 3/16 |
| GB | 2159784 A * | | 12/1985 | ............ B62J 11/00 |
| GB | 2569347 A * | | 6/2019 | ............ B62J 11/00 |
| JP | S56175290 U | | 12/1981 | |
| JP | 2007-302240 A | | 11/2007 | |
| WO | WO-2017001983 A1 * | | 1/2017 | ............ B62J 11/00 |

* cited by examiner

BICYCLE DRINKING ASSEMBLY CONFIGURED FOR HOLDING A TYPE OF DRINKING BOTTLES WITH LARGE VOLUME BASE BODIES AS WELL AS STANDARD ONES WITH CYLINDRICAL BASE BODIES

CROSS-REFERENCE TO RELATED APPLICATIONS

This application the benefit of Netherlands Application No. 2025938, filed Jun. 29, 2020, the contents of which is incorporated by reference herein.

FIELD OF THE INVENTION

The present invention relates to bicycle drinking assemblies that comprise a bottle cage and a drinking bottle held therein, as well as to a bicycle equipped with such a drinking assembly.

BACKGROUND TO THE INVENTION

Such bicycle drinking assemblies are known since long in many variants. Most of them come with bottle cages that are configured to hold standard drinking bottles with mainly cylindrical base bodies of a certain standardized diameter. Those drinking bottles with cylindrical base bodies then may vary in length in order to obtain volumes of for example 500, 750, 1000 ml.

A disadvantage hereof is that the maximum volume that thus can be obtained is limited to the available place within a bicycle frame where the bottle cage gets mounted on. Another disadvantage is that the assemblies of bicycle frames with such bottle cages and drinking bottles with cylindrical base bodies are known to cause a lot of additional air resistance and thus negatively influence the cyclist's performances.

It is also known to provide bottle cages that can be adjusted in diameter of the holding space they delimit. Thus they can be adjusted for holding larger diameter drinking bottles.

A disadvantage hereof is that the larger the diameter gets, the larger the air resistance gets.

From the state of the art also all kinds of specifically shaped and dimensioned large volume type drinking bottles and correspondingly specifically shaped and dimensioned bottle cages are known. Their base bodies all have been given such cross-sectional shapes that much bulkier volumes are obtained and thus much larger capacities of water can be contained therein.

For example U.S. Pat. No. 4,441,638 shows a drinking bottle of which the body is of a block-like shape. With this the bottle cage comprises a fixing member, that can be fixed to a downtube of a bicycle frame by means of screws, and a bent spring wire, that is fixed at a lower end of the fixing member. In the mounted position of the bottle cage, the bottle can be inserted and clamped between a support surface of the fixing member and the bent spring wire. The fixing member has a concave mounting surface of a curvature equal to that of a curved top side surface of the downtube and a support surface mating with a front surface of the bottle. The fixing member also forms a shield which covers any gap which might exist between the front surface of the bottle and the downtube. During cycling a smooth air flow can thus take place along the downtube, the shield of the fixing member and the bottle, thereby not generating negative turbulences and not increasing air resistance of the bicycle.

This positive air resistance effect is further increased in that the block-like body is made rather slender with opposing side walls that gradually decrease from the bottle's front surface to its rear surface, and with those front and/or rear surfaces formed in a circular arc smaller in curvature than the downtube of the frame.

A disadvantage hereof however is that the specifically shaped and dimensioned bottle cage is only suitable to hold its own dedicated specifically shaped and dimensioned water-bottle. This makes the drinking assembly rather inflexible. If you for example are in the middle of a cycling race and need a new bottle from a neutral support station, then you will most likely not receive a bottle that will fit in the specifically shaped and dimensioned bottle cage on your bicycle. It probably only shall fit therein with such large play that a risk of losing it is high, which can be dangerous for other cyclists in the race. Also it may mean that the newly received drinking bottle is going to make a lot of rattling noise and add a lot of air resistance to your bicycle. In order to prevent that you would then need to pour the drink from the received bottle into your own, but that would also lead to dangerous situations or in losing valuable time.

A same sort of problem may arise when you lose your specifically shaped and dimensioned bottle or when it gets broken and you are not immediately able to have it replaced by a same type. Then also you might not be able to reliably place another bottle inside your cage, with a high risk of losing it, having it make a lot of noise and add a lot of air resistance to your bicycle.

Another example of a large volume drinking bottle is shown in JP-356175290-U. FIGS. 1 and 2 show a triangular type large volume drinking bottle of which the angle between its bottom and back walls has been made complementary to an angle between seat tube and down tube of a bicycle frame. The opposing side walls of the triangular type large volume drinking bottle is provided with groove-shaped indents into which inwardly angled gripping portions of a wire-frame grip with a form fit. The wire frame itself has U-shaped upper and lower portions to which the angled portions connect. The U-shaped portions are fixed to a flat mounting plate that is screwed onto the down tube.

A disadvantage here is that the user-friendliness of the triangular type large volume drinking bottle leaves to be desired. A simple sliding fit of the drinking bottle into the wire-frame is not foreseen nor possible. Instead a form fitting clamping is provided. It is difficult to quickly take the bottle out of its form-fit clamped position within the wire-frame and place it back there between again. For that a deformation of the wire-frame is required.

Another disadvantage is that the drinking assembly causes a lot of additional air resistance during cycling. Large gaps arise between the bottle's flat bottom wall, the wire-frame's flat mounting plate and the round down tube, which has a negative effect on the aerodynamics.

Yet another disadvantage is that the specifically shaped and dimensioned wire-frame is only destined to hold its own dedicated triangular type large volume drinking bottle with gripping grooves. Only slender cylindrical type drinking bottles with diameters that are substantially smaller than largest cross-sectional dimensions of the base body of the triangular type large volume drinking bottle may accidentally fit with a sliding fit between the wire-frame's inwardly angled gripping portions and the wire-frame's U-shaped upper and lower portions. Such slender cylindrical type drinking bottles then however are still destined to drop down through the wire-frame's U-shaped lower portion because it has been given the same dimensions as the wire-frame's U-shaped upper portion.

Thus, this known bicycle drinking assembly is rather inflexible in only being able to hold its own dedicated non-cylindrical type large volume drinking bottles. A 'standard' size cylindrical type drinking bottle shall not only be too large to fit with a sliding fit into the wire-frame, but also lacks downwards support.

CN-2019.77039-U shows another example of a non-cylindrical type drinking bottle that here is provided with C-shaped gripping indents that extend over its opposing side walls. The C-shaped gripping indents are configured to have complementary C-shaped gripping parts of a holder fit into them with a form fit. The holder is mounted with a flat mounting portion on a bicycle frame tube. The holder further comprises upper elastically deformable curved arms that at their free ends are provided with inwardly projecting thickened clamping knobs that are destined to grip into deepest sections of the gripping indents. The holder further comprises a bottom plate on top of which the bottle may rest.

A disadvantage here also is that the user-friendliness of the specifically shaped drinking bottle leaves to be desired. A simple sliding fit of the drinking bottle into the holder again is not foreseen nor possible. Instead a form fitting clamping is provided. It is difficult to quickly take the bottle out of its form-fit clamped position within the holder and place it back there between again. For that a deformation of the arms is required.

Another disadvantage is that it causes a lot of additional air resistance during cycling. Not only are the holder's mounting plate and the bottle's connecting wall portion that faces the cylindrical frame tube of the bicycle, flat, they also have smaller cross-sectional widths than the diameter of the cylindrical frame tube itself, from where the bottle's cross section dimension widens again. This may well cause all kinds of turbulence, which has a negative effect on the aerodynamics.

Yet another disadvantage is that the specifically shaped and dimensioned holder is only destined to hold its own dedicated type drinking bottle with its complementary shaped C-shaped gripping indents. Only slender cylindrical type drinking bottles with diameters that are substantially smaller than largest cross-sectional dimensions of the base body of the non-cylindrical type drinking bottle may accidentally fit with a sliding fit between the arms with its inwardly projecting thickened clamping knobs. Such slender cylindrical type drinking bottles then however are still destined to rest with way too much sideways play between upright edges of the bottom plate.

Thus, this known bicycle drinking assembly is also rather inflexible in only being able to hold its own dedicated non-cylindrical type large volume drinking bottles. A 'standard' size cylindrical type drinking bottle will not fit in this specifically shaped and dimensioned holder.

BRIEF DESCRIPTION OF THE INVENTION

The present invention aims to overcome those disadvantages at least partly or to provide a usable alternative. In particular the present invention aims to provide a user-friendly economic bicycle drinking assembly that is flexible during use while also being optimized for aerodynamics.

This aim is achieved by a bicycle drinking assembly according to the present invention. The bicycle drinking assembly comprises at least a first non-cylindrical type large volume drinking bottle that has a drinking opening, a base body with a left side wall portion and a right side wall portion that are connected to each other via connecting wall portions, and a bottom wall, and that together define a non-circular cross-section. The assembly further comprises a bottle cage with at least a first holding compartment that is configured for holding the first non-cylindrical type large volume drinking bottle, wherein the first holding compartment is configured to be mounted by means of first mounting elements on a mounting face of a tube, in particular of a downtube or seattube, of a bicycle frame.

According to the inventive thought, the first holding compartment besides being configured for holding the first non-cylindrical type large volume drinking bottle, preferably with a sliding fit, further is configured to hold a cylindrical type drinking bottle of a "standard" diameter that fits, preferably also with a sliding fit, within cross-sectional dimensions of the base body of the first non-cylindrical type large volume drinking bottle, wherein the mounting elements and/or first holding compartment form at least three points of contact, preferably discrete ones that lie at fixed positions relative to each other, that lie at a radius that is equal to half the diameter of the cylindrical type drinking bottle and that are divided over more than 180 degrees of the circumference of the cylindrical type drinking bottle. With the at least three points of contact it is meant to define a minimum amount of touchpoints between cage and bottle that are multi-purpose in that they are able to automatically come to lie against either the non-fully cylindrical base body of the large volume type bottle either against the fully cylindrical base body of a more standard cylindrical type bottle that get placed there between, in particular with a sliding fit.

Thus advantageously an assembly of a cage and a bottle is obtained that on the one hand is optimized for the large amounts of liquids it can store in its large volume bottles, that can also be optimized for aerodynamics, while at a same time also making a reliable temporary use of replacement bottles with cylindrical base bodies possible. Thus for the first time a large volume aero drinking solution is obtained of which the bottle cage also allows for the use of standard bottles. By keeping cross-sectional dimensions of the first non-cylindrical type large volume drinking bottle and cage at least in a limited number of directions, that is to say in those directions where the defined at least three points of contact lie to remain at the diameter of a standard cylindrical bottle, such a standard cylindrical bottle can still fit, preferably with a sliding fit, in the cage if the special first non-cylindrical type large volume drinking bottle is lost, broken or needs to be temporarily replaced by such a standard cylindrical bottle.

If for example the invention is used on a downtube that nowadays mostly have a flat or almost flat upper mounting face, then the bottle according to the invention, on its front half where the downtube is, can be made non-cylindrical, for example more square. The connecting wall portion of the first non-cylindrical type large volume drinking bottle that is destined to face towards the tube (also referred to as the tube-facing connecting wall portion) on that front half of the bottle then can even be made fully mating with the exact shape of the mounting face and/or be given the same width as the downtube.

Any space that normally would be left empty between a round face of a cylindrical base body of a standard bottle and the upper mounting face of the downtube behind which the bottle sits, now can efficiently be largely or entirely taken in by the first non-cylindrical type large volume drinking bottle in order to maximize its volume.

In a preferred embodiment the first non-cylindrical type large volume drinking bottle may have a cross-sectional width dimension between its left and right side wall portions, that is equal to the diameter of the cylindrical type drinking bottle. Thus both of them take in a same width behind or in front of the bicycle's tube and it is possible to achieve a same aerodynamics for both types of bottles, for example by having the first holding compartment comprise left and right shielding housing portions that on the one hand connect to the tube and on the other hand extend along and past the left and right side wall portions of the first non-cylindrical type large volume drinking bottle or past the cylindrical base body of the standard drinking bottle.

In a preferred embodiment the connecting wall portion of the first non-cylindrical type large volume drinking bottle that is destined to face away from the tube (also referred to as the tube-facing-away connecting wall portion) may form a semi-cylindrical wall of a radius that is equal to half the central cross-sectional width and depth dimensions of the first non-cylindrical type large volume drinking bottle. Thus one half of the bottle is formed with a semi-cylindrical base body, whereas the other half is formed with a non-semi-cylindrical, for example more squared, shape by means of the left and right side wall portions and the tube-facing connecting wall portion extending there between. This means that for same maximum overall height, width and depth dimensions as a standard cylindrical bottle sitting behind or in front of a tube of the bicycle frame, the first non-cylindrical type large volume drinking bottle can already contain substantially more liquid. This also means that a large part or even the entire semi-cylindrical tube-facing-away connecting wall portion of the large volume bottle as well as of the cylindrical base body of the standard bottle can advantageously form a semi-cylindrical contact face with a complementary shaped holding compartment of the cage.

In a preferred embodiment the tube-facing connecting wall portion of the first non-cylindrical type large volume drinking bottle may be shaped substantially flat or concavely curved and/or for substantially mating with a shape of the mounting face of the tube of the bicycle frame on which the first holding compartment of the bottle cage it is to be mounted. This maximizes the capacity of the large volume bottle at that side and helps to increase the aerodynamics.

In a preferred further or alternative embodiment the tube-facing connecting wall portion can be provided with a downwardly opening notch that is configured for taking in the first mounting elements of the first holding compartment during moving of the first non-cylindrical type large volume drinking bottle into and out of the bottle cage. Thus use can for example be made of headed male threaded mounting elements, in combination with female threaded mounting parts that are already present on the mounting face of the tube. The tube-facing connecting wall portion then is able to slide nicely and tight-fitting with its notch around any projecting mounting parts/elements.

In addition the downwardly opening notch may extend merely along a lower portion of the tube-facing connecting wall portion. This further helps to optimize the bottle capacity.

In addition the first mounting elements and/or first holding compartment may comprise a spring and/or clamping element that in a position in which the bottle is placed inside the cage gets to lie biased against the notch wall. This measure helps to reliably keep the bottle in place inside the cage, even when cycling on bumpy terrain or the like. In the alternative the cage can also be constructed partly open while at a same time being dimensioned somewhat smaller than the first non-cylindrical type large volume drinking bottle such that the cage is able to flex somewhat open when a bottle gets placed in it and thus also exert a clamping action thereupon.

In a preferred further or alternative embodiment the tube-facing connecting wall portion of the first non-cylindrical type large volume drinking bottle may have a width dimension that is equal to a width of the mounting face of the tube of the bicycle frame. Thus a step-free gradual transition can be obtained along which a smooth air flow can take place during cycling, firstly along for example a lower side of the downtube and from there along the side walls of the bottle, thereby not generating negative turbulences and not increasing air resistance of the bicycle.

The bottle cage can be designed as an open construction, for example as a bent spring wire that forms said points of contact for either the large volume drinking bottle either the standard cylindrical bottle to stick into the cage securely.

In a preferred further or alternative embodiment however the first holding compartment may comprise a housing that substantially envelops at least the base body of the bottle placed therein. This housing then may comprise a tube-facing housing portion that is shaped corresponding to at least part of the tube-facing connecting wall portion of the first non-cylindrical type large volume drinking bottle.

In addition or in the alternative the housing then may comprise left and right side housing portions and a tube-facing-away housing portion that are shaped corresponding to at least part of the left and right side wall portions and tube-facing-away connecting wall portion of the first non-cylindrical type large volume drinking bottle. The thus closely enveloping bottle cage construction helps to reduce the air resistance and thus improve the aerodynamics of the drinking assembly. Furthermore it helps to protect the bottles placed therein.

The drinking assembly can be mounted on all kinds of tubes of the bicycle frame, like the downtube or the seattube, and/or on all kinds of mounting face shapes of such tubes, like flat or convexly curved, and/or in all kinds of positions relative to such tubes, like behind or in front of them.

In a preferred further or alternative embodiment the first holding compartment can be configured to be mounted by means of the first mounting elements on a top mounting face of a downtube of the bicycle frame. Thus it is protected against impact and easy to reach.

In addition the assembly then may further comprise a second non-cylindrical type large volume drinking bottle that, like the first non-cylindrical type large volume drinking bottle, also has a bottom wall, a base body with left and right side wall portions that are connected to each other via tube-facing and tube-facing-away connecting wall portions, and that together define a non-circular cross-section, and a drinking opening, wherein the bottle cage further has a second holding compartment that is configured for holding the second non-cylindrical type large volume drinking bottle, wherein the second holding compartment is configured to be mounted by means of second mounting elements on a front mounting face of a seattube of the bicycle frame, and wherein, according to the inventive thought, the second holding compartment besides being configured for holding the second non-cylindrical type large volume drinking bottle, preferably with a sliding fit, further is configured to hold a "standard" cylindrical type drinking bottle of a diameter that fits, preferably also with a sliding fit, within cross-sectional dimensions of the base body of the second non-cylindrical type large volume drinking bottle, wherein the mounting elements and/or second holding compartment form at least three points of contact, preferably discrete ones that lie at fixed positions relative to each other, that lie at a radius that is equal to half the diameter of the cylindrical type drinking bottle and that are divided over more than 180 degrees of the circumference of the cylindrical type drinking bottle. Thus the capacity on the bicycle in drinking volume is doubled without losing any flexibility whatsoever with respect to also being able to hold two standard cylindrical bottles in the cage according to the invention.

In addition the second holding compartment further may comprise left and right side housing portions that are shaped corresponding to at least part of the left and right side wall portions of the second non-cylindrical type large volume drinking bottle, and that can be made integral with the left and right side housing portions of the first holding compartment. Thus a truly aerodynamic assembly is obtained of a bottle cage with two holding compartments, one that is to sit behind a downtube and one that is to sit in front of a seattube, which assembly is able to hold two inventive types of large volume drinking bottles or if necessary in the alternative also two standard cylindrical drinking bottles.

In addition the bottom wall of the first and/or second non-cylindrical type large volume drinking bottles at least partly may lie angled relative to a centre axis of its corresponding first or second non-cylindrical type large volume drinking bottle, in particular at an angle that is the same as an angle between a centre axis of a downtube and a centre axis of a seattube of the bicycle frame on which the first and second holding compartments of the bottle cage are to be mounted. Thus it can be achieved that even at the bottom sides of the bottles an optimization in capacity can be obtained owing to the bottles getting to comprise specifically shaped tail portions at that location that are able to come to lie closely abutting against each other or against the angled transition between the tubes.

Further preferred embodiments of the invention are stated in herein.

The invention also relates to a bicycle comprising a bicycle frame with the above described bicycle drinking assembly being mounted on one or more mounting faces of tubes, in particular of a downtube and/or seattube, of the bicycle frame.

BRIEF DESCRIPTION OF THE DRAWINGS

The invention shall now be explained in more detail below by means of describing some exemplary embodiments in a non-limiting way with reference to the accompanying drawings, in which:

FIGS. 10a and 10b show cross-sectional views through the base bodies of the bottles lying inside their holding compartment mounted on the downtube as shown in FIGS. 1 and 6, respectively.

DETAILED DESCRIPTION OF THE INVENTION

Figure 1:
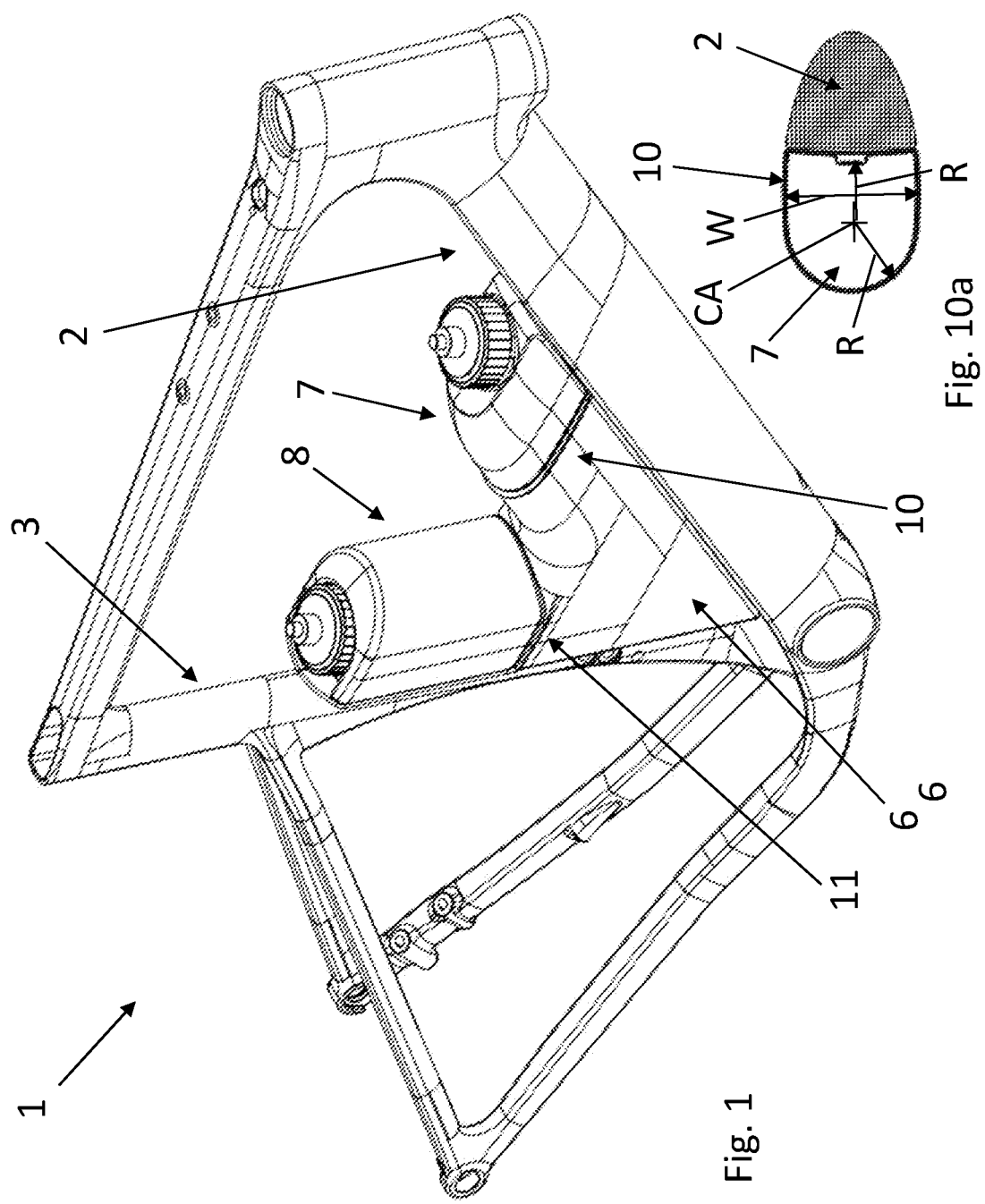
FIG. 1 shows a schematic perspective view of a bicycle drinking assembly according to the invention mounted on a bicycle frame.
Figure 2:
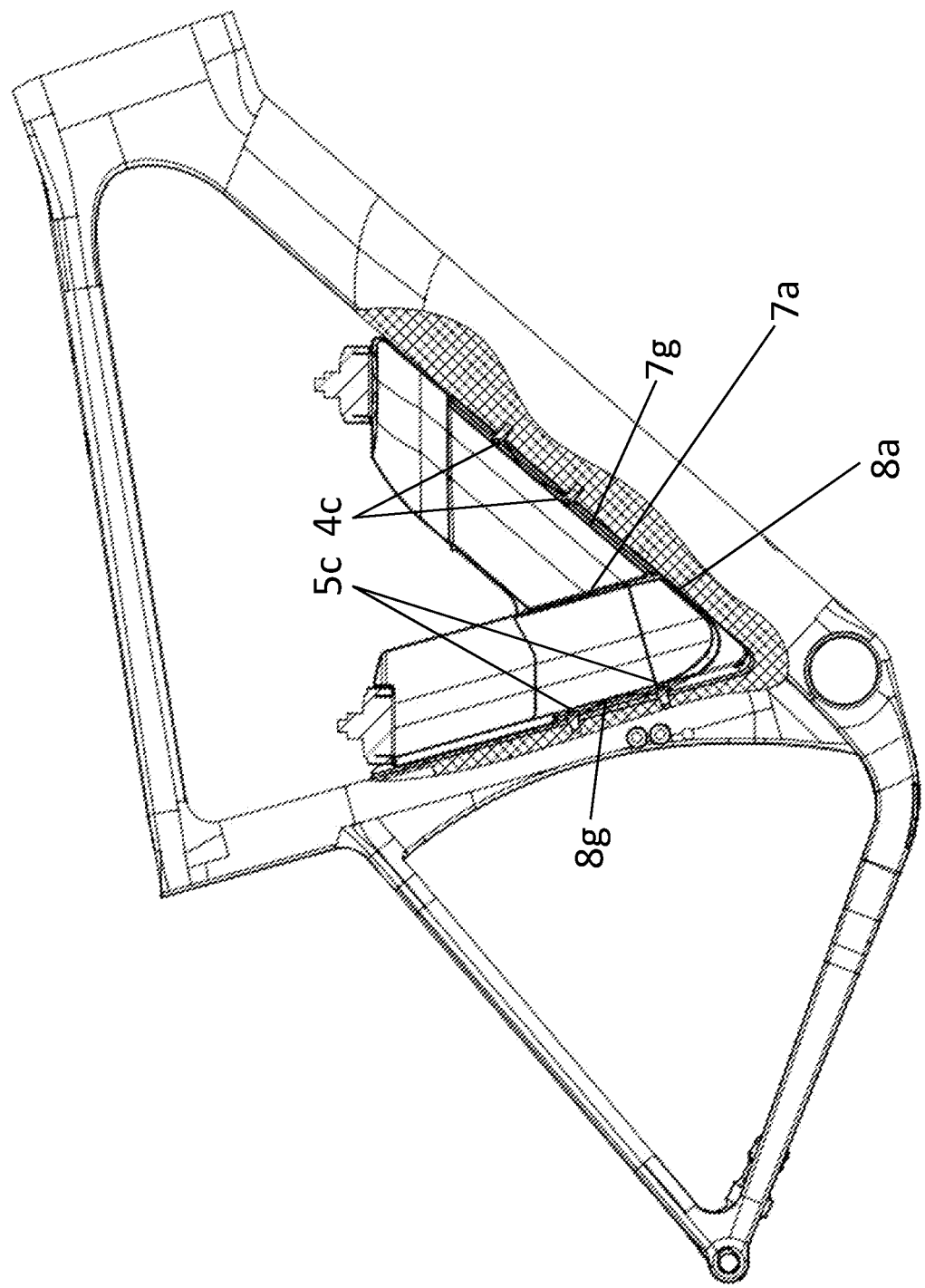
FIG. 2 shows a side view of FIG. 1 partially cut open at a position of the drinking assembly.
Figure 3:
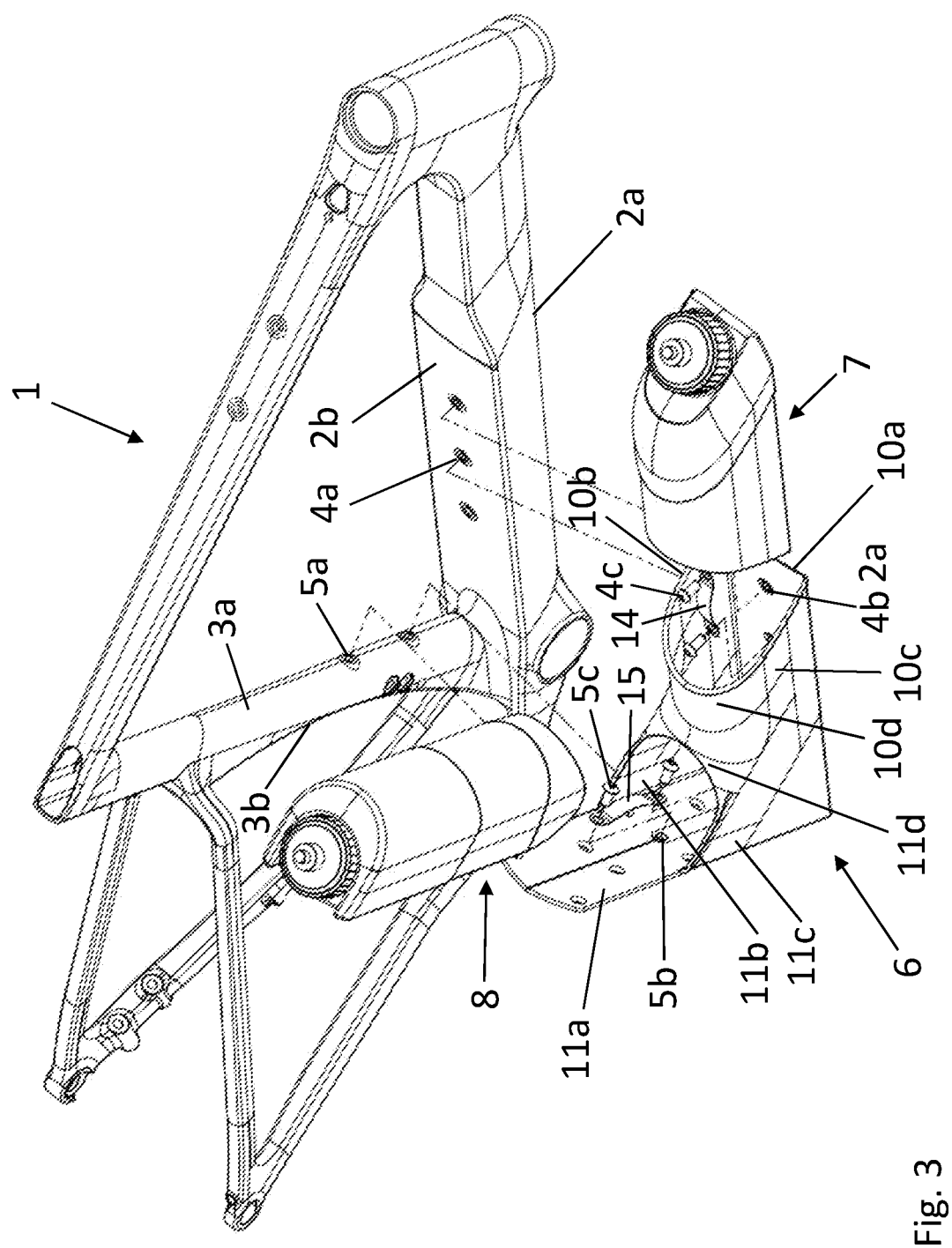
FIG. 3 shows the view of FIG. 1 in a disassembled state.
Figure 4:
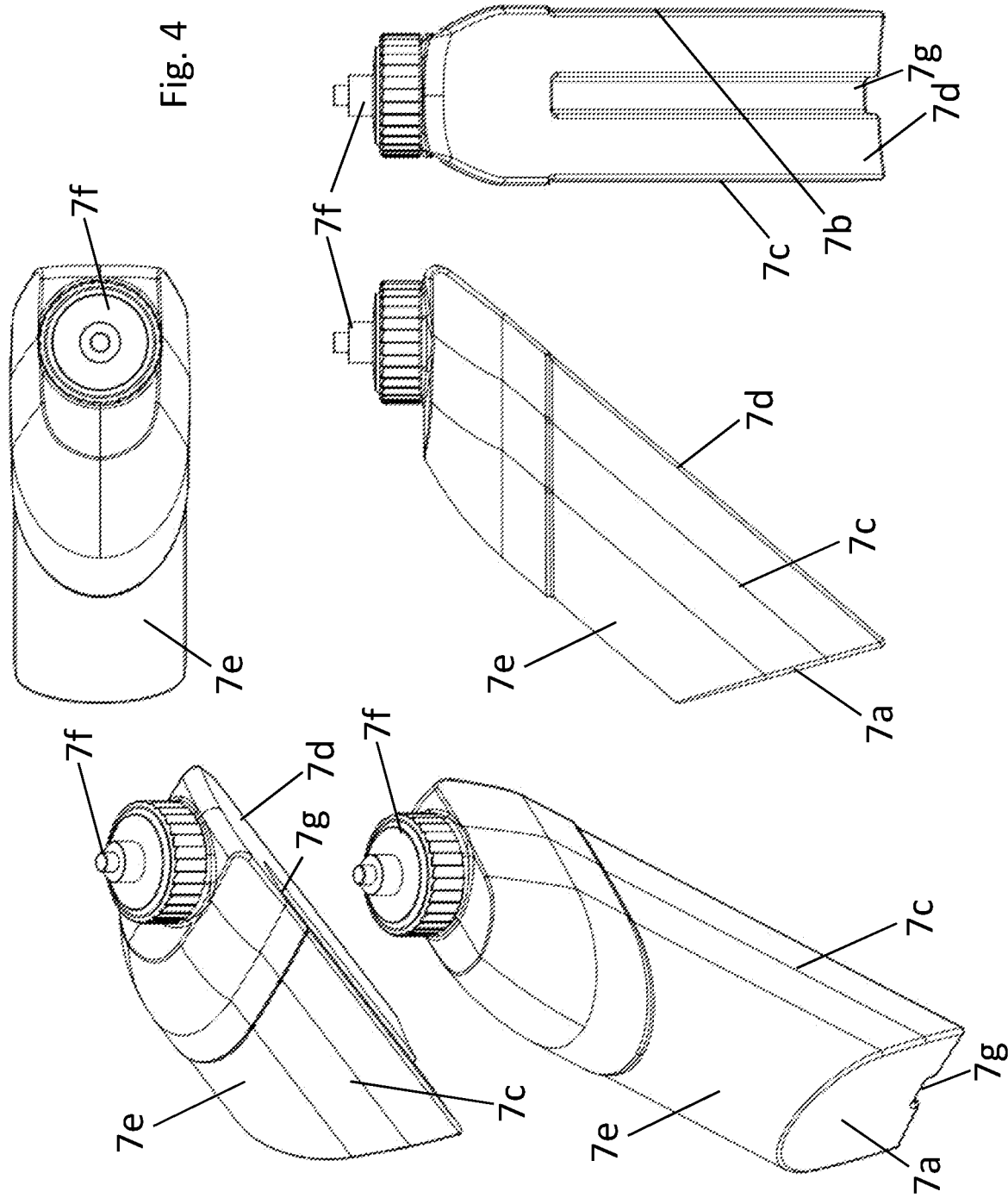
FIG. 4 shows the first non-cylindrical type large volume drinking bottle.
Figure 5:
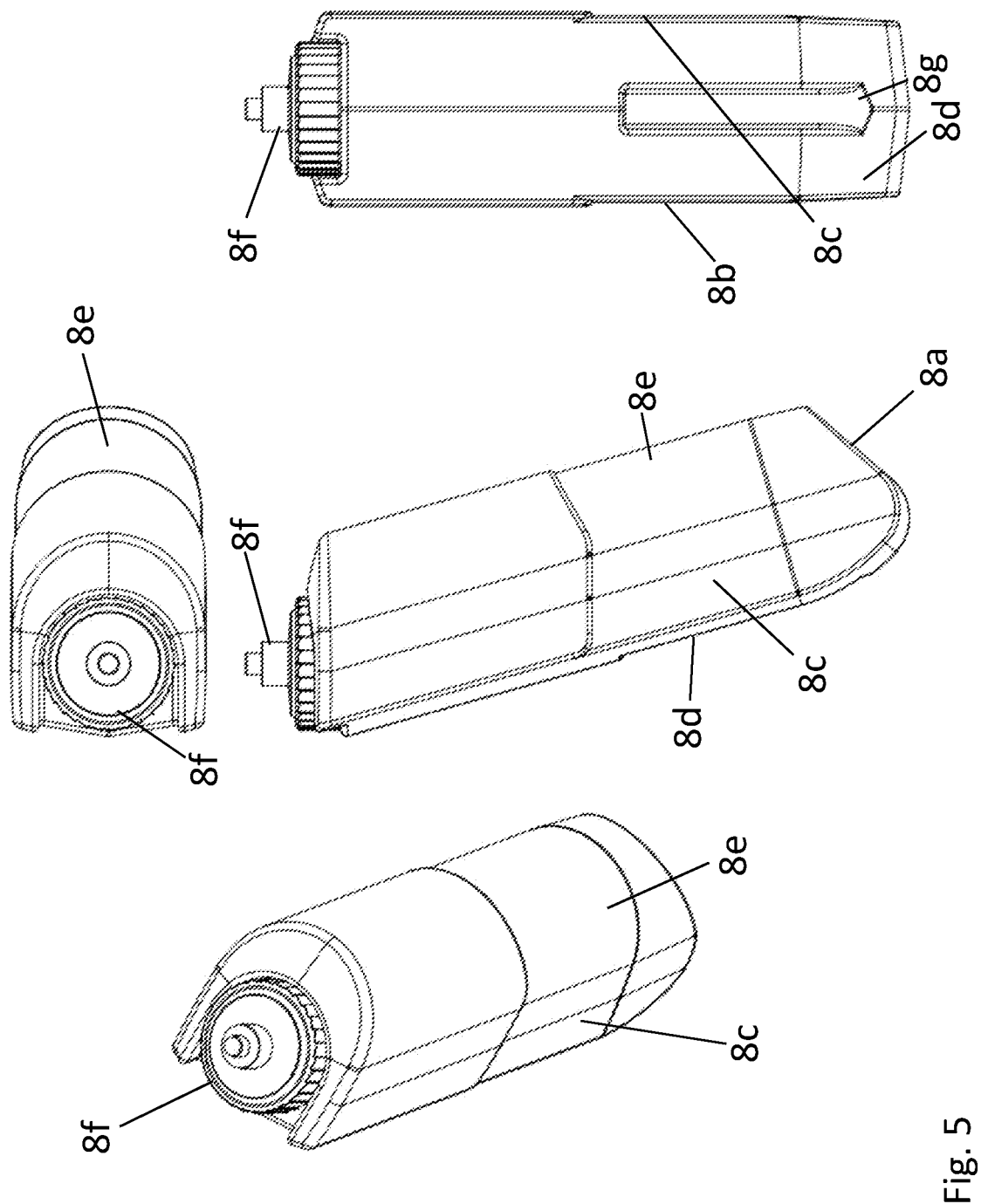
FIG. 5 shows the second non-cylindrical type large volume drinking bottle.

In FIG. 1-3 a bicycle frame is shown that has been given the reference numeral 1. The frame 1 comprises a downtube 2 and a seattube 3 that are integrally connected to each other while enclosing an angle. The downtube 2 has an aerodynamic convexly curved bottom face 2a and a flat top mounting face 2b. See also FIG. 10a. The seattube 3 has an aerodynamic convexly curved front mounting face 3a and a back face 3b. The mounting face 2b is provided with female threaded inserts as first mounting parts 4a, whereas the mounting face 3a is provided with female threaded inserts as second mounting parts 5a.

A drinking assembly of a bottle cage 6 and first and second non-cylindrical types large volume drinking bottles 7 resp. 8 to be placed therein, is mounted to the frame 1 at a position in the angle between the downtube 2 and the seattube 3.

The "downtube" bottle 7 has a lower base body delimited by an angled bottom wall 7a, a left side wall portion 7b and a right side wall portion 7c that are connected to each other via a tube-facing connecting wall portion 7d and a tube-facing-away connecting wall portion 7e. On its upper part a drinking opening 7f is provided. The tube-facing connecting wall portion 7d is shaped flat for mating with the flat top mounting face 2b. The tube-facing-away connecting wall portion 7e forms a semi-cylindrical wall of a radius R that is equal to half a cross-sectional width W between the opposing side wall portions 7b, 7c which in turn is only slightly smaller than the maximum width of the downtube 2 and its mounting face 2b. A lower section of the tube-facing connecting wall portion 7d is provided with a central downwardly opening notch 7g. In other words, the "downtube" bottle 7 thus has a typical cross-section through its base body that has a flat front side and a U-shaped back side, of which the flat front side is partly provided with an indent. See also FIG. 10a.

The "seattube" bottle 8 has a lower base body delimited by a partially angled partially curved bottom wall 8a, a left side wall portion 8b and a right side wall portion 8c that are connected to each other via a tube-facing connecting wall portion 8d and a tube-facing-away connecting wall portion 8e. On its upper part a drinking opening 8f is provided. The substantially flat tube-facing connecting wall portion 8d is shaped with two slightly angled flat faces at opposing sides of a centre axis. The tube-facing-away connecting wall portion 8e forms a semi-cylindrical wall of a radius R that is equal to half a cross-sectional width W between the opposing side wall portions 8b, 8c which here is chosen to be substantially the same as the one of the "downtube" bottle 7. A lower section of the tube-facing connecting wall portion 8d is provided with a central downwardly opening notch 8g. In other words, the "seattube" bottle 8 thus has a typical cross-section through its base body that has a substantially flat back side and a U-shaped front side, of which the substantially flat back side is partly provided with an indent.

The bottle cage 6 comprises a first holding compartment 10 that is configured for holding the first non-cylindrical type large volume drinking bottle 7 and for that forms a first holding space with a first insert opening delimited by a housing. This first holding compartment 10 comprises a flat tube-facing housing portion 10a that is shaped and dimensioned corresponding to the flat tube-facing connecting wall portion 7d of the bottle 7 as well as to the flat mounting face 2b of the downtube 2. This housing portion 10a is provided with mounting openings 4b through which male threaded mounting elements 4c can be screwed into the mounting parts 4a. The first holding compartment 10 further comprises left and right side housing portions 10b and 10c and a tube-facing-away housing portion 10d. The tube-facing-away housing portion 10d forms a semi-cylindrical wall of a radius R that is equal to half a cross-sectional width W between the opposing side wall portions 10b, 10c which in turn is the same as the maximum width W of the downtube 2 and its mounting face 2b. In other words, the "downtube" holding compartment 10 thus has a cross-sectional shape with a flat front and a U-shaped back, that is complementary to and that together closely envelop the large volume bottle 7 placed therein. With that, heads of the mounting elements 4c lie within the notch 7g, whereas a spring plate 14 that is mounted in between the mounting elements 4c lies biased against a wall of the notch 7g. See FIG. 2.

The bottle cage 6 further comprises a second holding compartment 11 that is configured for holding the second non-cylindrical type large volume drinking bottle 8 and for that forms a second holding space with a second insert opening delimited by the housing. This second holding compartment 11 comprises a substantially flat tube-facing housing portion 11a that has two slightly angled flat faces at opposing sides of a centre axis for shielding of the convexly curved front mounting face 3a and that is shaped and dimensioned corresponding to the substantially flat tube-facing connecting wall portion 8d of the bottle 8. This housing portion 11a is provided with mounting openings 5b through which male threaded mounting elements 5c can be screwed into the mounting parts 5a. Halfway the substantially flat tube-facing housing portion 11a, the second insert opening is provided. The second holding compartment 11 further comprises left and right side housing portions 11b and 11c and a tube-facing-away housing portion 11d both integrally connecting and gradually diverging into the housing portions of the first holding compartment 10. The tube-facing-away housing portion 11d delimits a semi-cylindrical opening edge of a radius R that is equal to half a cross-sectional width W between the opposing side wall portions 11b, 11c which here is chosen to be the same as the maximum width W of the downtube 2 and its mounting face 2b. In other words, the "seattube" holding compartment 11 thus has an insert opening of a shape that has a circumference with a substantially flat back edge and a U-shaped front edge, that is complementary to and that together closely envelop the cross-sectional shape of the second non-cylindrical type large volume bottle 8 placed therein. With that, heads of the mounting elements 5c lie within the notch 8g, whereas a spring plate 15 that is mounted in between the mounting elements 5c lies biased against a wall of the notch 8g. See FIG. 2.

Figure 6:
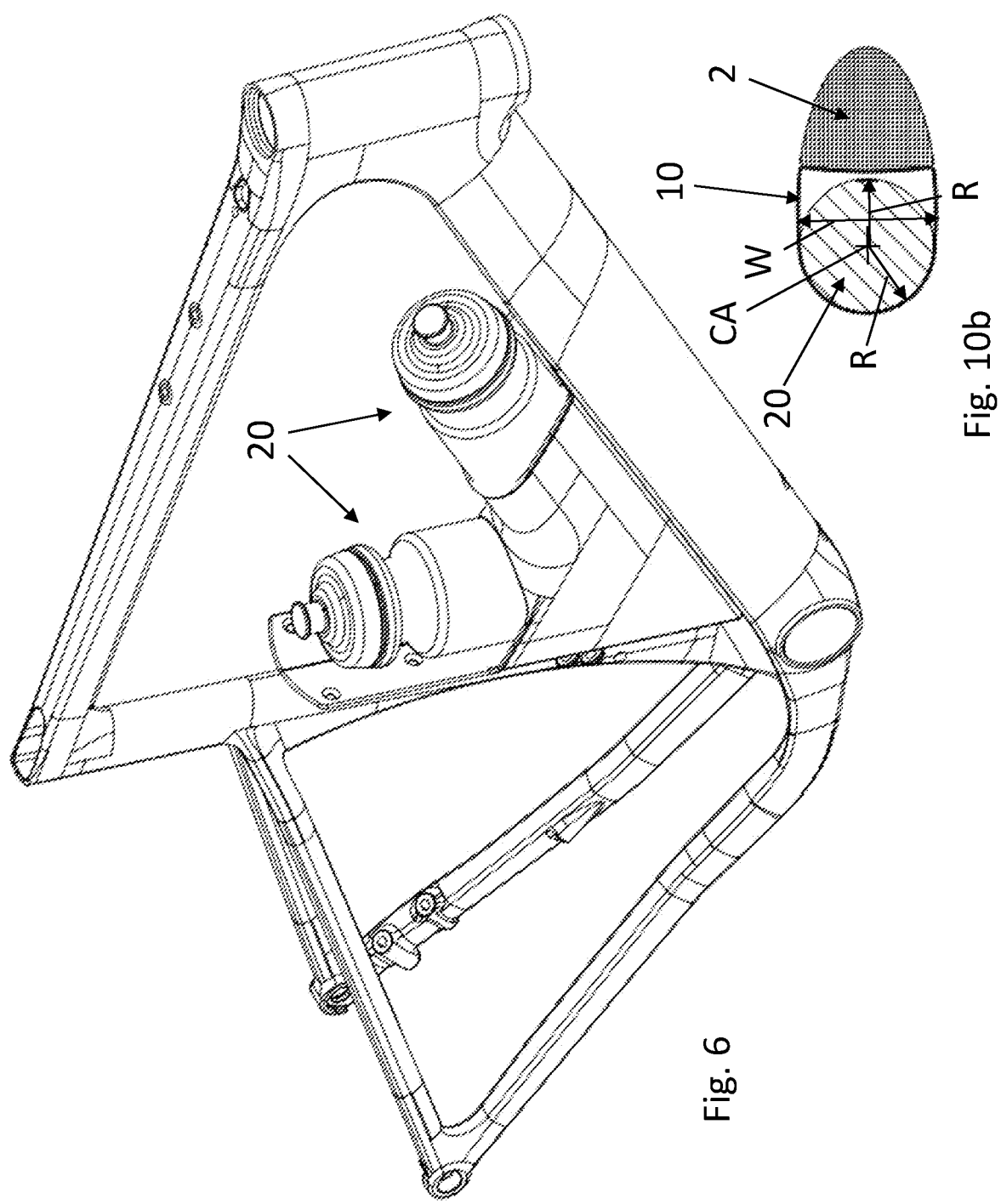
FIG. 6 shows the view of FIG. 1 with the large volume bottles replaced for cylindrical drinking bottles.

Owing to their specific shaping and dimensioning, both holding compartments 10, 11 are also able to hold standard drinking bottles 20 with a mainly cylindrical base body of a diameter that is the same as the abovementioned 2*R and W of the first and second non-cylindrical type large volume drinking bottles 7, 8. This can be seen in FIGS. 6 and 10b. The cylindrical base bodies on the one hand have a perfect fitting surface contact with the semi-cylindrical connecting wall portions 7e, 8e, which thus are well able to provide way more than at least two points of contact at opposing sides of the tube-facing-away connecting wall portion 7e, whereas on the other hand they come to lie in line contact against the mounting elements 4c, 5c that also lie at the same radius R of a center axis CA of the insertion openings cq holding spaces. In the placed position this center axis CA of the insertion openings cq holding spaces coincides with a center axis of the base body of the large volume bottles 7 or with a center axis of the cylindrical base body of the standard cylindrical bottles 20, while both type of bottles 7, 20 are firmly held by the semi-cylindrical contact of their holding portion 10 and the points of contact with the mounting elements 4c lying opposite thereto all lying at a same circle.

Figure 7:
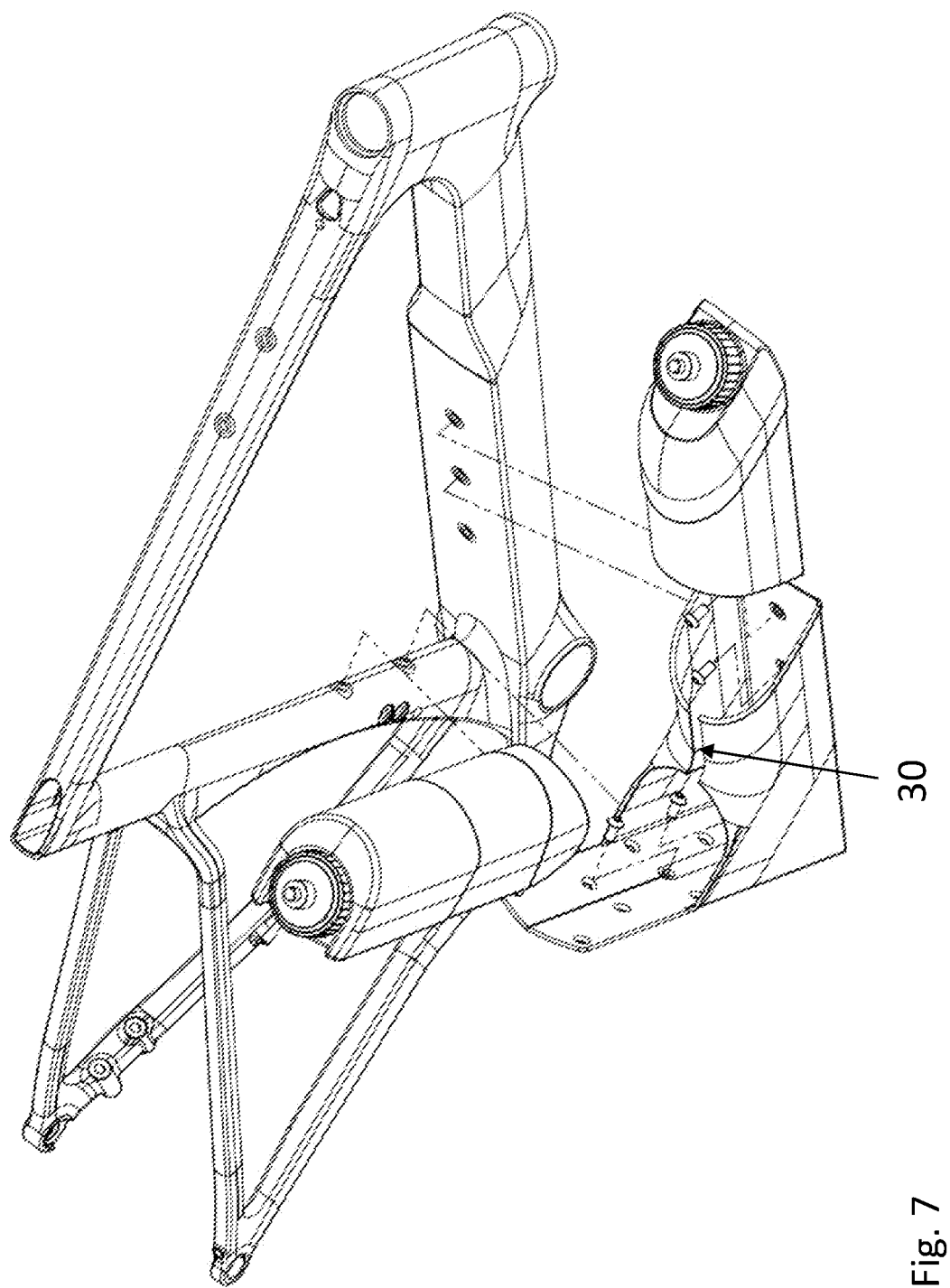
FIG. 7 shows a view according to FIG. 3 with a variant bottle cage.

FIG. 7 shows a variant in which the housing of the cage has been provided with a central slit 30. Thus left and right housing halves are obtained that can flex somewhat outwards when either a large volume either a standard bottle gets placed therein. This flexing provides an alternative clamping action for the spring plates onto the inserted bottles.

Figure 8:
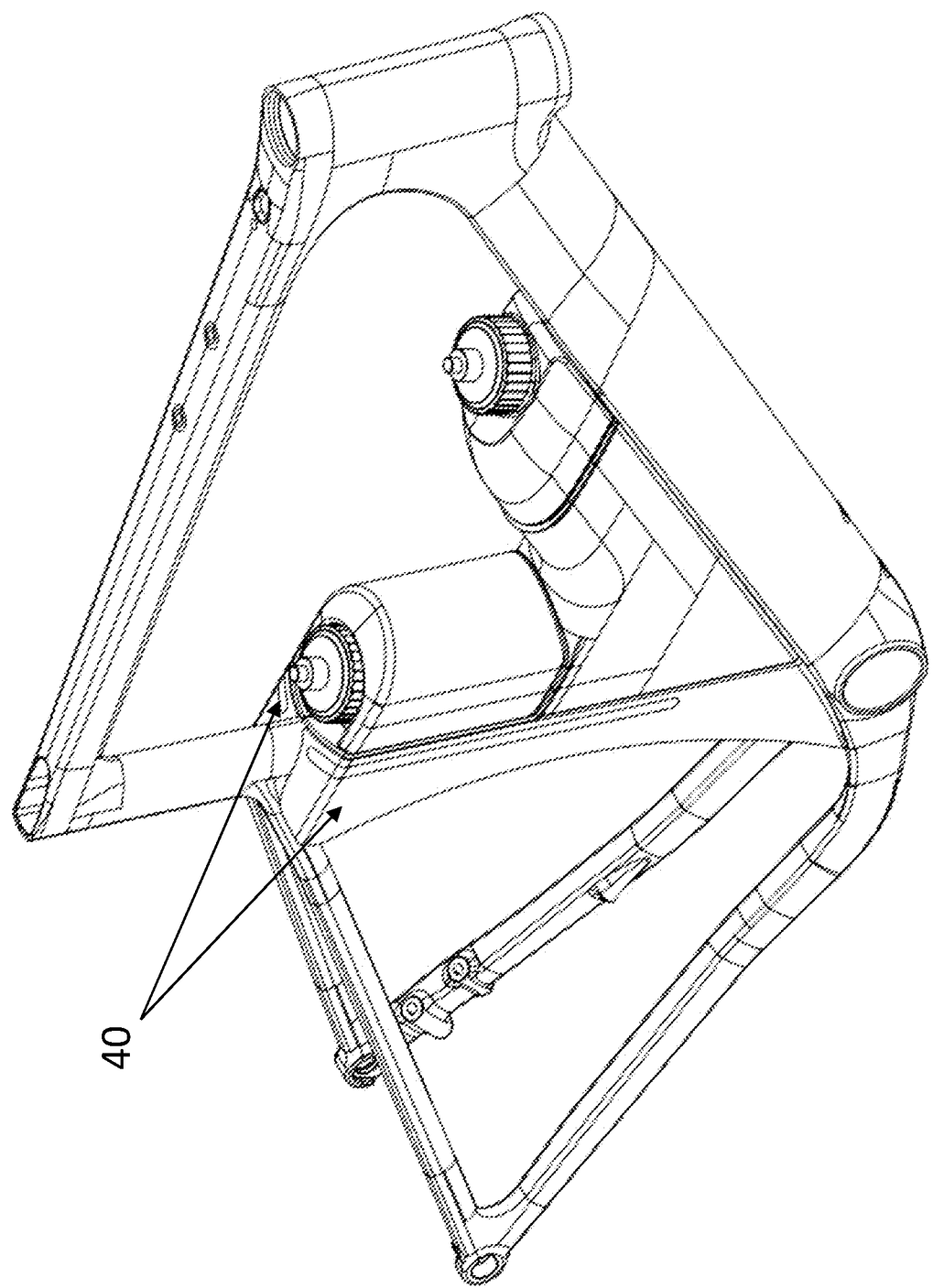
FIGS. 8 and 9 show views according to FIGS. 1 and 3 with two additional tool holders mounted to a back side of the bottle cage.
Figure 9:
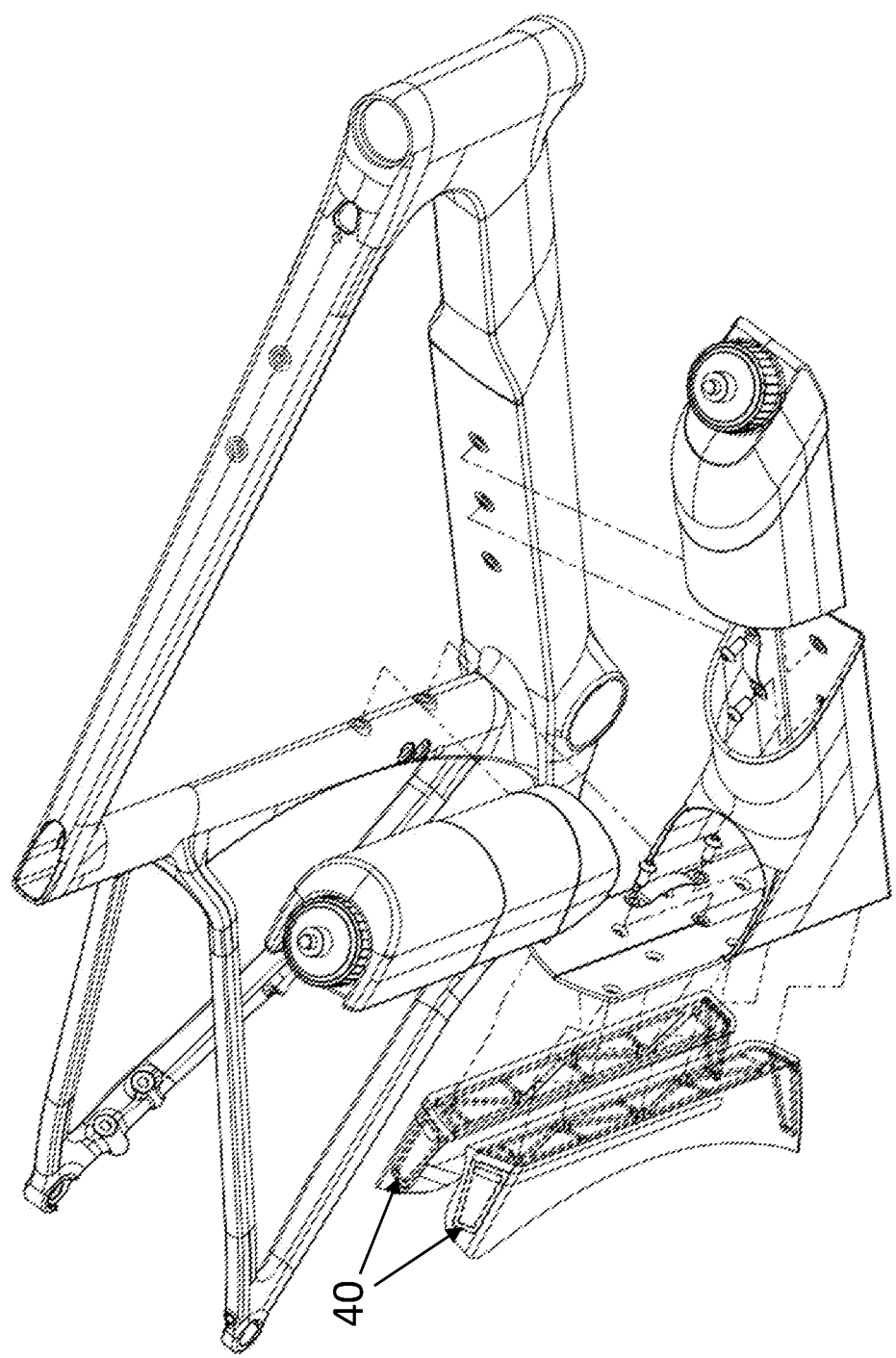

FIGS. 8 and 9 show an addition to the assembly of FIG. 1-7. This addition is formed by two aerodynamically shaped compartments 40 that get mounted against a back of the two slightly angled flat faces of the substantially flat tube-facing housing portion 11a. Each compartment 40 at its back side is shaped as a circular arc similar to the back of the seattube such that they together shield of an arc segment over a thickness of for example a big tire, for example 40-60 mm wide, of a wheel that gets mounted in the frame 1. In this way large tube widths can be shielded of from the air, which aids in optimizing the aerodynamics of the bicycle. The compartments for example can be used for storing some tools therein.

Figure 11B:
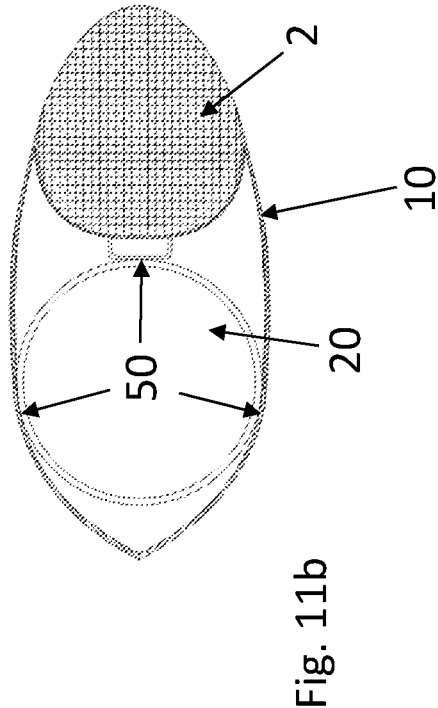
FIGS. 11a and 11b show views according to FIGS. 10a and 10b, respectively, of a variant drinking assembly mounted on an alternative shape of downtube.
Figure 11A:
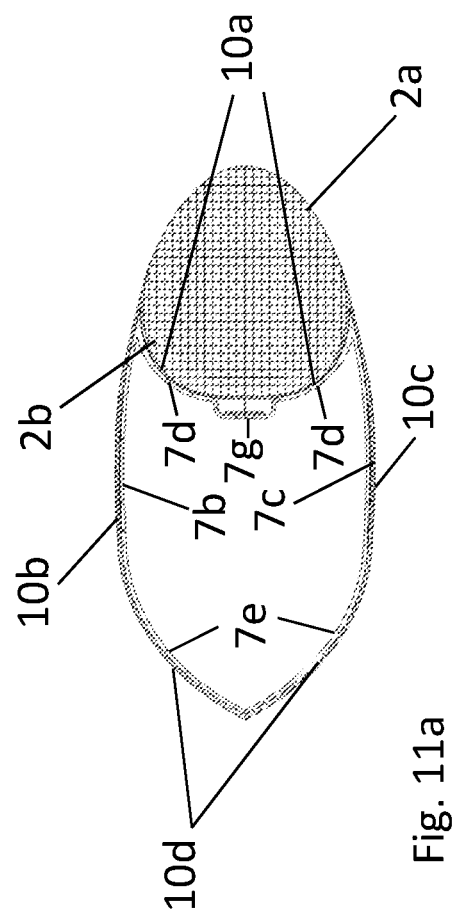

In FIG. 11a a downtube 2 is shown with a different cross-sectional profile, that is to say one with a convexly curved mounting face 2b. Then also the inventive idea can be used for the holding portion 10 of the bottle cage 6 and the large volume drinking bottle 7 placed therein. This is achieved by the tube-facing connecting wall portion 7d being shaped concavely curved for mating with the convexly curved top mounting face 2b. Further it can be seen here that the side wall portions 7b and 7c first gradually widen along a same tangential line as the ends of the convexly curved bottom face 2a of the downtube 2, then have portions extending straight backwards to then continue into the tube-facing-away connecting wall portion 7e that here no longer is semi-cylindrical, but instead ends sharp-edged. Thus the capacity of the bottle 7 is increased whereas its aerodynamics has been improved. The same goes for the housing portions that closely envelop the described bottle's cross sectional shape.

In FIG. 11b it can be seen that when the standard bottle 20 gets placed inside the holding portion 10, that the bottle 20 then comes to lie with three points of contact 50 divided substantially equally around the circumference of the bottle against on the one hand the mounting elements 4c and on the other hand against the side wall portions 10b and 10c cq opposing left and right ones of the tube-facing away housing portions 10d.

Here also it goes that in the placed position this center axis CA of the insertion openings cq holding spaces coincides with a center axis of the base body of the large volume bottles 7 or with a center axis of the cylindrical base body of the standard cylindrical bottles 20, while both types of bottles 7, 20 are firmly held by the two points of contact 50 of their holding portion 10 and by the points of contact 50 with the mounting elements 4c lying opposite thereto all lying at a same circle.

Besides the shown and described embodiments, numerous variants are possible. For example the dimensions and shapes of the various parts can be altered. Also it is possible to make combinations between advantageous aspects of the shown embodiments.

It should be understood that various changes and modifications to the presently preferred embodiments can be made without departing from the scope of the invention, and therefore will be apparent to those skilled in the art. It is therefore intended that such changes and modifications be covered by the appended claims.

What is claimed is:

1. A bicycle drinking assembly, comprising:
    at least a first non-cylindrical type drinking bottle that has:
        a bottom wall;
        a base body with a left side wall portion and a right side wall portion that are connected to each other via a tube-facing connecting wall portion and a tube-facing-away connecting wall portion, and that together define a non-circular cross-section;
        a drinking opening;
    a bottle cage with at least a first holding compartment that is configured for holding the first non-cylindrical type drinking bottle,
    wherein the first holding compartment is configured to be mounted by means of first mounting elements on a mounting face of a tube of a bicycle frame,
    wherein the first holding compartment besides being configured for holding the first non-cylindrical type drinking bottle further is configured to hold a cylindrical type drinking bottle of a diameter that fits within cross-sectional dimensions of the base body of the first non-cylindrical type drinking bottle, and
    wherein the mounting elements and first holding compartment form at least three points of contact that lie at fixed positions relative to each other at a radius that is equal to half the diameter of the cylindrical type drinking bottle and that are divided over more than 180 degrees of the circumference of the cylindrical type drinking bottle;
    wherein the tube-facing connecting wall portion of the first non-cylindrical type drinking bottle is shaped flat or concavely curved for mating with a shape of the mounting face of the tube of the bicycle frame on which the first holding compartment of the bottle cage is to be mounted, and
    wherein the tube-facing connecting wall portion of the first non-cylindrical type drinking bottle has a width dimension that is equal to a width of the mounting face of the tube of the bicycle frame.

2. The bicycle drinking assembly according to claim 1, wherein the first non-cylindrical type drinking bottle has a largest cross-sectional width dimension between its left and right side wall portions, that is equal to the diameter of the cylindrical type drinking bottle.

3. The bicycle drinking assembly according to claim 1, wherein the tube-facing-away connecting wall portion forms a semi-cylindrical wall of a radius that is equal to half the largest cross-sectional width dimension of the first non-cylindrical type drinking bottle.

4. The bicycle drinking assembly according to claim 1, wherein the first holding compartment comprises a tube-facing housing portion that is shaped corresponding to at least a part of the tube-facing connecting wall portion of the first non-cylindrical type drinking bottle.

5. The bicycle drinking assembly according to claim 1, wherein the first holding compartment comprises left and right side housing portions and a tube-facing-away housing portion that are shaped corresponding to at least a part of the left and right side wall portions and tube-facing-away connecting wall portion of the first non-cylindrical type drinking bottle.

6. The bicycle drinking assembly according to claim 1, wherein the first holding compartment is configured to be mounted by means of the first mounting elements on a top side mounting face of a downtube of the bicycle frame.

7. A bicycle comprising a bicycle frame with the bicycle drinking assembly according to claim 1 mounted by means of mounting elements on one or more mounting faces of tubes of the bicycle frame.

8. A bicycle drinking assembly, comprising:
    at least a first non-cylindrical type drinking bottle that has:
        a bottom wall;
        a base body with a left side wall portion and a right side wall portion that are connected to each other via a tube-facing connecting wall portion and a tube-facing-away connecting wall portion, and that together define a non-circular cross-section;
        a drinking opening;
    a bottle cage with at least a first holding compartment that is configured for holding the first non-cylindrical type drinking bottle,
    wherein the first holding compartment is configured to be mounted by means of first mounting elements on a mounting face of a tube of a bicycle frame,
    wherein the first holding compartment besides being configured for holding the first non-cylindrical type drinking bottle further is configured to hold a cylindrical type drinking bottle of a diameter that fits within cross-sectional dimensions of the base body of the first non-cylindrical type drinking bottle,
    wherein the mounting elements and first holding compartment form at least three points of contact that lie at a radius that is equal to half the diameter of the cylindrical type drinking bottle and that are divided over more than 180 degrees of the circumference of the cylindrical type drinking bottle, and
    wherein the tube-facing connecting wall portion is provided with a downwardly opening notch that is configured for taking in the first mounting elements of the first holding compartment during moving of the first non-cylindrical type drinking bottle into and out of the bottle cage.

9. The bicycle drinking assembly according to claim 8, wherein the downwardly opening notch extends merely along a base of the tube-facing connecting wall portion.

10. The bicycle drinking assembly according to claim 8, wherein the first mounting elements or first holding compartment comprise a spring and/or clamping element.

11. A bicycle drinking assembly, comprising:
    at least a first non-cylindrical type drinking bottle that has:
        a bottom wall;
        a base body with a left side wall portion and a right side wall portion that are connected to each other via a tube-facing connecting wall portion and a tube-facing-away connecting wall portion, and that together define a non-circular cross-section;

a drinking opening;
a bottle cage with at least a first holding compartment that is configured for holding the first non-cylindrical type drinking bottle,
wherein the first holding compartment is configured to be mounted by means of first mounting elements on a mounting face of a tube of a bicycle frame,
wherein the first holding compartment besides being configured for holding the first non-cylindrical type drinking bottle further is configured to hold a cylindrical type drinking bottle of a diameter that fits within cross-sectional dimensions of the base body of the first non-cylindrical type drinking bottle, and
wherein the mounting elements and first holding compartment form at least three points of contact that lie at a radius that is equal to half the diameter of the cylindrical type drinking bottle and that are divided over more than 180 degrees of the circumference of the cylindrical type drinking bottle,
further comprising:
a second non-cylindrical type drinking bottle that has:
a bottom wall;
a base body with a left side wall portion and a right side wall portion that are connected to each other via a tube-facing connecting wall portion and a tube-facing-away connecting wall portion, and that together define a non-circular cross-section;
a drinking opening;
wherein the bottle cage further has a second holding compartment that is configured for holding the second non-cylindrical type drinking bottle,
wherein the second holding compartment is configured to be mounted by means of second mounting elements on a front side mounting face of a seattube of the bicycle frame,
wherein the second holding compartment besides being configured for holding the second non-cylindrical type drinking bottle further is configured to hold a cylindrical type drinking bottle of a diameter that fits within cross-sectional dimensions of the base body of the second non-cylindrical type drinking bottle, and
wherein the mounting elements and second holding compartment form at least three points of contact that lie at a radius that is equal to half the diameter of the cylindrical type drinking bottle and that are divided over more than 180 degrees of the circumference of the cylindrical type drinking bottle.

12. The bicycle drinking assembly according to claim 11, wherein the second holding compartment further comprises left and right side housing portions that are shaped corresponding to at least a part of the left and right side wall portions of the second non-cylindrical type drinking bottle, and that are made integral with the left and right side housing portions of the first holding compartment.

13. The bicycle drinking assembly according to claim 11, wherein the second holding compartment further comprises left and right side housing portions that are shaped corresponding to at least a part of the left and right side wall portions of the second non-cylindrical type drinking bottle, and that are made integral with the left and right side housing portions of the first holding compartment.

14. The bicycle drinking assembly according to claim 11, wherein the bottom wall of the first and second non-cylindrical type drinking bottles at least partly lies angled relative to a centre axis of its corresponding first or second non-cylindrical type drinking bottle.

15. The bicycle drinking assembly according to claim 14, wherein an angle at which the bottom wall of the first and second non-cylindrical type drinking bottles lie relative to a centre axis of its corresponding first or second non-cylindrical type drinking bottle is the same as an angle between a centre axis of a downtube and a centre axis of a seattube of the bicycle frame on which the first and second holding compartments of the bottle cage are to be mounted.

* * * * *